(12) United States Patent
Kiselev et al.

(10) Patent No.: US 7,702,863 B1
(45) Date of Patent: *Apr. 20, 2010

(54) METHOD OF DATA CACHING IN MIRRORED STORAGE

(75) Inventors: Oleg Kiselev, Palo Alto, CA (US); Ronald S. Karr, Palo Alto, CA (US)

(73) Assignee: Symantec Operating Corporation, Cupertino, CA (US)

( * ) Notice: Subject to any disclaimer, the term of this patent is extended or adjusted under 35 U.S.C. 154(b) by 1182 days.

This patent is subject to a terminal disclaimer.

(21) Appl. No.: 10/749,862

(22) Filed: Dec. 31, 2003

Related U.S. Application Data

(63) Continuation-in-part of application No. 10/610,604, filed on Jul. 1, 2003, now Pat. No. 7,028,156.

(51) Int. Cl.
*G06F 13/00* (2006.01)
(52) U.S. Cl. .......................... 711/161; 714/6
(58) Field of Classification Search ................ 711/162; 714/6
See application file for complete search history.

(56) References Cited

U.S. PATENT DOCUMENTS

| | | | |
|---|---|---|---|
| 6,321,298 B1 * | 11/2001 | Hubis | 711/124 |
| 6,993,677 B1 * | 1/2006 | Wilner | 714/6 |
| 2003/0145270 A1 | 7/2003 | Holt | 714/766 |
| 2003/0167439 A1 | 9/2003 | Talagala et al. | 714/770 |
| 2004/0205298 A1 * | 10/2004 | Bearden et al. | 711/137 |

* cited by examiner

*Primary Examiner*—Christian P Chace
*Assistant Examiner*—Jared I Rutz
(74) *Attorney, Agent, or Firm*—Campbell Stephenson LLP

(57) ABSTRACT

Data from a first mirror of a data volume is returned to the computer system in response to receiving the first read request. Additionally, data from second mirror of the data volume is read in response to receiving the first read request. The data read from the second mirror may be stored in a cache memory. The computer system may check the returned data to determine whether it is corrupted. If corrupted, the computer system sends a second read request for the same data. Rather than returning the same corrupted data stored in the first mirror, a copy of the requested data is returned from the cache memory.

17 Claims, 3 Drawing Sheets

| n | Data Identification | Data Copy | Time Stamp |
|---|---|---|---|
| 1 | block 2 | $D_1$ | $T_1$ |
| 2 | block 7 | $D_2$ | $T_2$ |
| 3 | block 5 | $D_3$ | $T_3$ |
| 4 | block 30 | $D_4$ | $T_4$ |
| 5 | block 1 | $D_5$ | $T_5$ |
| 6 | block 10 | $D_6$ | $T_6$ |

METHOD OF DATA CACHING IN MIRRORED STORAGE

This application is a continuation-in-part of application Ser. No. 10/610,604, filed in the U.S. Patent Office on Jul. 1, 2003 now U.S. Pat. No. 7,028,156, and entitled Use Of Read Data Tracking And Caching To Allow Cooperating Application To Recover From Data Corruption. The foregoing application is incorporated herein by reference.

BACKGROUND OF THE INVENTION

Many businesses employ a data system in which one or more memory devices (e.g., data storage disks) store critical data. The number of memory devices employed in a data system varies as a function of the data storage demands. As will be more fully described below, however, the frequency of data corruption incidents increases with the number of memory devices used to store data.

FIG. 1 shows a data system in which a computer system 10 is coupled to a host node 12. Host node 12, in turn, is coupled to data-storage systems 14 and 16. Each of data-storage systems 14 and 16 includes memory devices 24 and 26, respectively, for storing data. Each of the memory devices 24 and 26 may include several components (e.g., data storage disks). For purposes of explanation, memory devices 24 and 26 contain a single data storage disk, it being understood that the term memory device should not be limited thereto.

The data storage disks 24 and 26 store mirrors $M_0$ and $M_1$, respectively, of a mirrored data volume V. Mirror is $M_0$ the working data volume for the system shown in FIG. 1 in that host node 12 reads data from or writes data to the mirror $M_0$ in response to a read or write request from client computer system 10 or other client computer systems (not shown). Host node 12 may take form in a computer system (e.g., a server computer system). read or write request from client computer system 10 or other client computer systems (not shown). Host node 12 may take form in a computer system (e.g., a server computer system).

Mirror $M_1$ closely track data changes to mirror $M_0$. When host node 12 writes new data to mirror $M_0$, the same data is also written to mirror $M_1$ in disk 26 via a separate transaction (hereinafter referred to as a mirroring write transaction). As such, mirror $M_1$ is maintained as a real or near real-time copy of mirror $M_0$. The mirror of disk 26 is typically provided as a backup solution if data mirror $M_0$ in disk 24 is rendered inaccessible as the result of hardware or software failure. Thus, if disk 24 suddenly becomes inaccessible, host node 12 can continue to service read or write requests from client computer system 10 using mirror $M_1$ in disk 26.

Failure of disk 24 is one problem facing businesses that employ large scale data storage systems. Data corruption is another problem. Data corruption has many sources. Data corruption can occur, for example, when host node 12 fails to properly overwrite old data with new data. To illustrate, suppose host node 12 seeks to overwrite old data $D_{old}$ in mirror $M_0$ with new data $D_{new}$ in response to a write request received from computer system 10. As a result of improper operation of hardware or software, new data $D_{new}$ is inadvertently written to a track in disk 24 near the disk track that stores the old data $D_{old}$. This type of data corruption is often referred to as mis-tracking. Yet another example of data corruption may occur when one or more bits in new data $D_{new}$ are inadvertently flipped just before the new data $D_{new}$ is written to disk 24. This type of data corruption is often referred to as bit-flipping and often occurs while data is handled in transit to its ultimate storage location. As a result of bit-flipping, the track that stores old data $D_{old}$ is overwritten with bad data. Another type of error corruption can occur when new data $D_{new}$ is not written to disk 24 at all even though the host node 12 believes the new data $D_{new}$ to be written. When any of these types of errors occur, one or more instances of data corruption may occur on disk 24. While corruption may occur to disk 24 as a result of writing new data $D_{new}$, the new data $D_{new}$ may be properly written to disk 26 via the mirroring write transaction.

Host node 12 may not be aware that the disk 24 contains corrupted data. To illustrate this effect, suppose host node 12 receives a first request to read data identified by some name (e.g., a filename or block ID number). Host node 12 accesses and reads data stored in disk 24 on one or more tracks corresponding to the name of the data sought. The tracks, however, contain data corrupted as a result of mis-tracking. Host node 12 may lack the ability to determine whether the data read from disk 24 is corrupted. As such, host node 12 may unwittingly return a copy of the corrupted data to computer system 10.

Client computer system 10, however, may be able to detect data corruption. Client computer system 10 may perform a checking algorithm on the data returned by host node 12 to identify data corruption. If computer system 10 recognizes that the data returned is corrupted, the computer system may send a second request for the same data. Unfortunately, host node 12 will once again return the same corrupted data from disk 24 in response to the second request.

SUMMARY OF THE INVENTION

In one embodiment, a first read request is received from a computer system. Data from a first mirror of a data volume is returned to the computer system in response to receiving the first read request. Additionally, data from second mirror of the data volume is read in response to receiving the first read request. The data read from the second mirror may be stored in a cache memory. The computer system may check the returned data to determine whether it is corrupted. If corrupted, the computer system sends a second read request for the same data. Rather than returning the same corrupted data stored in the first mirror, a copy of the requested data is returned from the cache memory.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
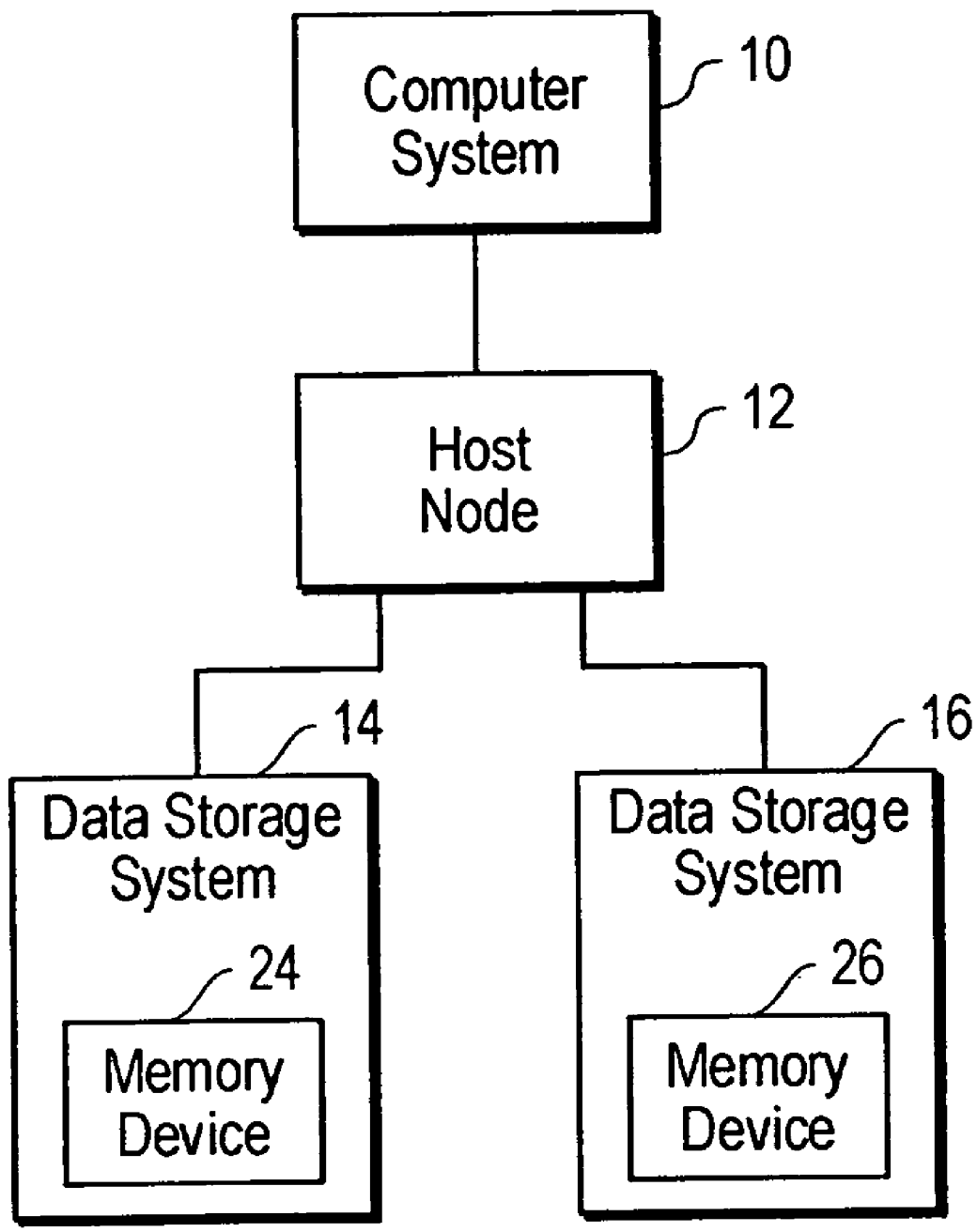
FIG. 1 is a block diagram of a prior art data storage system.
Figures 2, 3:
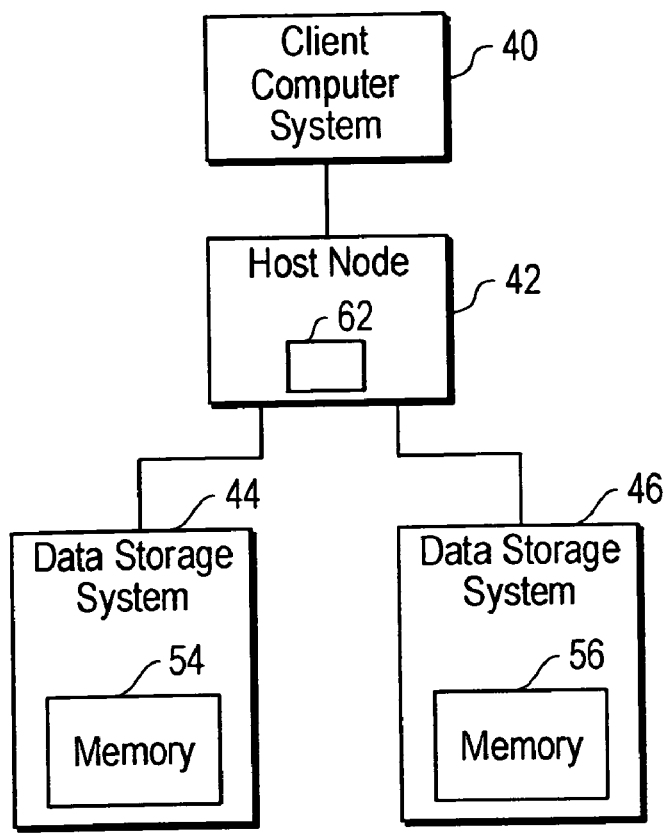
FIG. 2 is a block diagram of a data storage system employing one embodiment of the present invention.
FIG. 3 is a block diagram of a history of read request table employed in one embodiment of the present invention.

FIG. 2 illustrates relevant components of a data system employing one embodiment of the present invention. More specifically, FIG. 2 shows, in block-diagram form, a client computer system 40 coupled to a host node 42. Although not shown, additional client computer systems may be coupled to host node 42. Host node 42, in turn, is coupled to data-storage systems 44 and 46. Host node 42 will be described as having direct data read and write access to data-storage systems 44 and 46, it being understood that the present invention should not be limited thereto.

Each of data-storage systems 44 and 46 includes memories 54 and 56, respectively. Each of the memories 54 and 56 may take form in one or more dynamic or static random-access memories, one or more arrays of magnetic or optical data-storage disks, or combinations thereof. Memories 54 and 56 should not be limited to the foregoing hardware components; rather, the memories may take form in any hardware, software, or combination of hardware and software in which data may be persistently stored and accessed. Further, the memories may take form in a complex construction of several hardware components operating under the direction of software. For purposes of explanation only, each of the memory devices 54 and 56 will take form in a single data storage disk, it being understood that the present invention should not be limited thereto.

Host node 42 may take form in a computer system (e.g., a server computer system) having a memory (not shown) for storing instructions that, when executed by host node 42, implements an embodiment of the present invention. Host node 42 may include a data-storage management system (not shown) that takes form in software instructions executing on one or more processors (not shown). The data-storage management system may include, in one embodiment, a file system and a system for managing the distribution of data across multiple memory devices. VERITAS Volume Manager™ provided by VERITAS Software Corporation of Mountain View, Calif., is an exemplary system for managing the distribution of data of a volume across one or more memory devices.

Disks 54 and 56 store a mirrored volume V. For purposes of explanation, the mirrored volume V includes two mirrors designated $M_0$ and $M_1$. The present invention may be applied to a data volume that includes more than two mirrors. Mirror $M_0$ or $M_1$ may be stored across disks 54 and 56. For purposes of explanation, disk 54 will be described as storing all data contents of mirror $M_0$ while disk 56 stores all data contents of mirror $M_1$. One mirror is often designated as the primary or preferred mirror for a specific I/O or for all I/Os. For purposes of explanation, mirror $M_0$ will be designated as the preferred mirror. As is well known in the art, write operations are sent to all mirrors of a mirrored volume when new data is written to mirrored volume V, while read operations can be satisfied from any of the mirrors. When host node 42 writes new data to the mirrored volume V in response to a request received from client computer system 40 or other client computer systems (not shown), the new data is written to each mirror $M_0$-$M_2$ via separate write transactions. When host node 42 writes new data to mirror $M_0$, the same data is also written to mirror $M_1$ in disk 46 via a mirroring write transaction. As such, host node 42 maintains mirrors $M_0$ and $M_1$ as real or near real-time copies of each other. However, reads are often sent to the mirror designated as preferred to gain better performance by taking advantage of read-ahead caches on disks and disk arrays, as well as to optimize for non-uniform connectivity latencies in the storage interconnects.

Mirror $M_1$ acts as redundant backup to mirror $M_0$. If disk 54 is rendered inaccessible due to hardware or software failure, host node 42 can respond to a read or write request from computer system 40 using mirror $M_1$. The foregoing storage layout description should not be taken as the only way of storing data volumes. Each volume may span or stripe differently across multiple data storage systems.

Computer system 40 generates requests to read data. Each request identifies the data sought by a unique name (e.g., a filename or block ID). Host node 42 receives the read data requests from computer system 40. As will be more fully describe below, if the read data request is an initial request for the data, host node 12 reads and returns the requested data from mirror $M_0$. Computer system 40 may perform a checking algorithm to determine whether the returned data is corrupted. If computer system 40 determines that data returned to it is corrupted, computer system 40 may generate a second request for the same data. The second request is transmitted to host node 42. As will be more fully described below, rather than return the same corrupted data from mirror $M_0$ in response to receiving the second request, host node 42 may return a copy of the requested data from mirror $M_1$. Chances are small that the copy of the requested data in mirror $M_1$ is also corrupted.

Host node 42, in one embodiment, includes a data cache memory that stores a read history table 66 (FIG. 3). It is noted that host node 42 may store a separate read history table in memory 62 for each client computer system that provides host node 42 with requests to read data from the mirrored volume. However, for purposes of explanation, it will be presumed that only read history table 66 is stored in memory 62, and that read history table 62 is associated with client computer system 40. It is further noted that cache 62 may be located externally to host node 42.

Data access time for cache 62 is faster than the data access time for memories 56 or 58. For example, the time needed for host node 42 to read data from memory 56 is greater than the time needed for host node 42 to read a copy of the same data stored in cache 62.

Read history table 66 stores data entries. Each data entry consists of data copied from mirror $M_1$, an identification (e.g., block ID) of the data copied into the entry, and a time stamp indicating the time when the entry was first created. Host node 42 can modify the contents of any entry in table 66. Host node 42 may use the read history table 66 to determine whether a read data request from computer system 40 is an initial request (if it is, host node 42 will return the requested data from mirror $M_0$) or a subsequent request (if it is, host node 42 may return a mirrored copy of the requested data stored in read history table 66).

Figure 4:
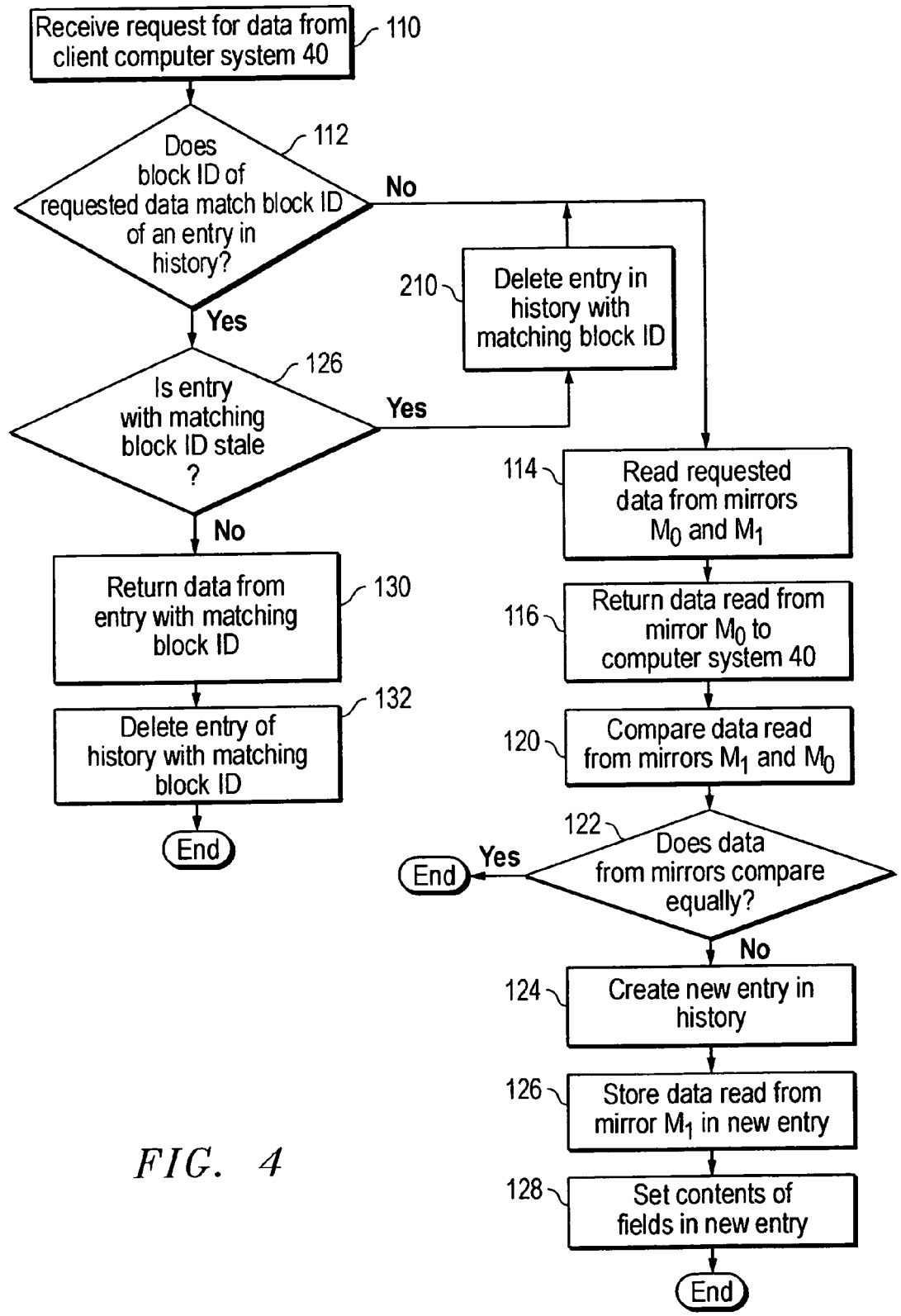
FIG. 4 is a flow chart illustrating operational aspects of responding to a request to read data in the data storage system of FIG. 2 according to one embodiment of the present invention.

FIG. 4 is a flow chart illustrating relevant operational aspects performed by host node 42 to determine which mirror (i.e., $M_0$ or $M_1$) should be used to service a read data request from computer system 40 according to one embodiment of the present invention. The process shown in FIG. 4 begins when host node 42 receives a request from computer system 40 to read data identified by, e.g., a block ID. Host node 42 in step 112 accesses the read history table 66 to determine whether the block ID of the received request matches the block ID of a read history table entry. If the request received in step 110 is an initial request for the data, there will be no match between the block IDs in the entries and the block ID of the requested data. Presuming no match in step 112, the process proceeds to step 114 where host node 42 reads the requested data from mirrors $M_0$ and $M_1$. In step 116, host node 42 returns the requested data read from mirror $M_0$. In step 120 host node 42 compares the data read from mirrors $M_0$ and $M_1$. If the data from mirrors $M_0$ and $M_1$ compare equally, then a presumption is made that the requested data returned in step 116 is not corrupted and the process ends. However, if the data from mirrors $M_0$ and $M_1$ do not compare equally in step 122, then host node 42 then the process proceeds to steps 124-128 where host node 42 creates a new entry in the read history table, stores the data read from mirror $M_1$ in the newly created entry, and sets the contents of the data identification field and the time stamp field. In step 128, host node 42 stores the block ID of the requested data (i.e., the block ID of the data stored in the newly created entry) into the data identification field of the newly created entry, and host node 42 stores the current time $T_c$ into the time stamp field.

The data returned to computer system 40 in step 116 may be corrupted. Computer system 40 will check the validity of the data returned. If the validity check fails, computer system 40 generates a second request for the same data. Again, it is noted that the second request will use the same block ID of the initial request. Client computer system 40 generates a second or subsequent request for the same data when client computer system 40 determines that previously returned data is corrupted. It will be presumed that a second or subsequent computer system 40 request for data is generated soon after (i.e., within a predetermined amount of time $T_{set}$) the previously returned data was found to be corrupted.

Presuming the request received in step 110 is a second request, host node 42 in step 112 should find a match between the block ID of the second request and the block ID of an entry in the read history table. When that match is discovered, the process proceeds to step 126 where host node 42 determines whether the entry with matching block ID is stale. Host node 42 determines whether the entry is stale in step 126 by comparing the current time with the time stamp of the entry having the matching block ID. If host node 42 determines that the entry having a matching block ID is stale, then host node 42 deletes the entry with the matching block ID before proceeding to steps 114-128.

If the time stamp is less than a predetermined amount of time $T_{set}$ latter than the current time, the entry with the matching block ID is not stale, and the process proceeds to step 130. In this step, host node 42 returns the data stored in the entry having the matching block ID. Thereafter, host node 42 deletes the entry in the read history table that has the matching block ID.

As an aside, it is noted that at any point host node 42 may modify data in either of the mirrors $M_0$ or $M_1$ in response to receiving a write data transaction. Before modification, host node 42 will delete any entry in table 66 that stores a copy of the data of the mirrors before modification via the write data transaction.

In an alternative embodiment the data volume may consist of more than two mirrors $M_0$ and $M_1$. The present invention can be employed using a modified version of the process shown in FIG. 4. The process shown in FIG. 4 can be modified so that data read from all mirrors are read in step 114 and compared in step 120. If data of any two mirrors do not compare equally, then host node 42 can create two or more entries in the history table 66 in step 124. In step 126, host node 42 stores a copy of the requested data from the mirrors (other than mirror $M_0$) into the newly created entries, respectively. Lastly, the process in FIG. 4 can be modified so that host node 42 sets the contents of each newly created entry.

It is noted that in an alternative embodiment the process shown in FIG. 4 can be simplified by eliminating steps 120 and 122 such that step 124 follows step 116. By eliminating steps 120 and 122 the host node processing bandwidth is freed to perform other tasks. This alternative embodiment may lead to a larger memory 62 for storing the read history table 66 when compared to the embodiment described with reference to FIG. 4.

In yet another alternative implementation, especially effective when the data volume consists of more than 2 mirrors, a different design of a read history entries can be used, where a single entry contains an ordered list of data blocks read from all mirrors, except mirror $M_0$. In step 126, host node 42 stores copies of the requested data from the mirrors (other than mirror $M_0$) into the newly created entry. Lastly, the process in step 130 of FIG. 4 is modified so that on the second and subsequent reads of the requested data, one of the alternate data versions stored in the history entry found in step 112, is returned. Step 132 is further modified to remove the returned data version from the history entry. If there are still data copies still left history entry, its time stamp is updated to the time of the most recent read request for the identified data and the read history entry isn't deleted. When all data copies had been returned due to repeated read requests for the same data, and the read history entry doesn't have any remaining data copies, the emptied entry can be removed from the read history.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

We claim:

1. A method comprising:
   receiving a first read request from a computer system;
   reading data from a first mirror of a data volume in response to receiving the first read request;
   reading data from a second mirror of the data volume in response to receiving the first read request;
   returning the data read from the first mirror to the computer system;
   storing the data read from the second mirror into a cache memory;
   receiving a second read request from the computer system, wherein the second read request is received subsequent to the first read request, and wherein the first and second read requests seek the same data;
   returning data stored in the cache memory in response to receiving the second read request.

2. The method of claim 1 further comprising:
   comparing an identification of data sought by the first read request with data identifications stored in a history of read requests in memory;
   wherein data is read from the data volume in response to determining that the identification of data sought by the first read request does not compare equally with at least one data identification stored in the history of read requests.

3. The method of claim 2 further comprising creating a new entry in the history of read requests, wherein the entry comprises the identification of data sought by the first read request and the time the first request was received.

4. The method of claim 3 further comprising;
   comparing the identification of data sought by the second read request with data identifications stored in the history of read requests;
   wherein data is returned from the cache memory in response to determining that the identification of data sought by the second read request compares equally with the data identification of the new entry.

5. The method of claim 1 further comprising comparing time T1 with time T2, wherein time T1 is the time when the first read request was received, and wherein time T2 is the time when the second read request was received.

6. The method of claim 5 further comprising returning the data stored in the cache memory in response to receiving the second request only if time T2 occurs within a predetermined amount of time after T1.

7. The method of claim 5 further comprising:
the computer system processing the data read from the first mirror;
the computer system generating the second read request in response to determining that the data read from the first mirror is corrupted.

8. The method of claim 1 further comprising comparing the data read from the first and second mirrors wherein the data read from second mirror is stored into the cache memory if the data read from the first and second mirrors do not compare equally.

9. A computer readable medium comprising instructions executable by a first computer system, wherein the first computer system performs a method in response to executing the instructions, the method comprising:
reading data from a first mirror of a data volume in response to receiving a first read request from a computer system;
reading data from a second mirror of the data volume in response to receiving the first read request;
returning the data read from the first mirror to the computer system;
storing the data read from the second mirror into a cache memory;
receiving a second read;
returning data stored in the cache memory in response to receiving a second read request from the computer system, wherein the second read request is received subsequent to the first read request, and wherein the first and second read requests seek the same data.

10. The computer readable medium of claim 9 wherein the method further comprises:
comparing an identification of data sought by the first read request with data identifications stored in a history of read requests in memory;
wherein data is read from the data volume in response to determining that the identification of data sought by the first read request does not compare equally with at least one data identification stored in the history of read requests.

11. The computer readable medium of claim 10 further comprising creating a new entry in the history of read requests, wherein the entry comprises the identification of data sought by the first read request.

12. The computer readable medium of claim 11 further comprising;
comparing the identification of data sought by the second read request with data identifications stored in the history of read requests;
wherein data is read from the cache memory in response to determining that the identification of data sought by the second read request compares equally with the data identification of the new entry.

13. The computer readable medium of claim 9 further comprising comparing time T1 with time T2, wherein time T1 is the time when the first read request was received, and wherein time T2 is the time when the second read request was received.

14. The computer readable medium of claim 13 further comprising reading the data stored in the cache memory in response to receiving the second request only if time T2 occurs within a predetermined amount of time after T1.

15. The computer readable medium of claim 13 further comprising:
the computer system processing the data read from the first mirror;
the computer system generating the second read request in response to determining that the data read from the first mirror is corrupted.

16. The computer readable medium of claim 9 further comprising:
comparing the data read from the first and second mirrors wherein the data read from second mirror is stored into the cache memory if the data read from the first and second mirrors do not compare equally.

17. A data processing system comprising;
a first computer system coupled to a memory system, wherein the memory system stores a data volume comprising a first mirror and a second mirror, wherein the first computer system comprises a memory for storing instructions executable by the first computer system, wherein the first computer system implements a method if the instructions are executed, the method comprising:
reading data from the first mirror in response to receiving a first read request from a computer system;
reading data from the second mirror of the data volume in response to receiving the first read request;
returning the data read from the first mirror to the computer system;
storing the data read from the second mirror into a cache memory;
returning data stored in the cache memory in response to receiving a second read request from the computer system, wherein the second read request is received subsequent to the first read request, and wherein the first and second read requests are for the same data.

* * * * *